Jan. 31, 1933.  J. P. SAPP  1,895,943
METHOD OF AND APPARATUS FOR REMOVING TIRES FROM MOLDS
Filed March 25, 1932  2 Sheets-Sheet 1
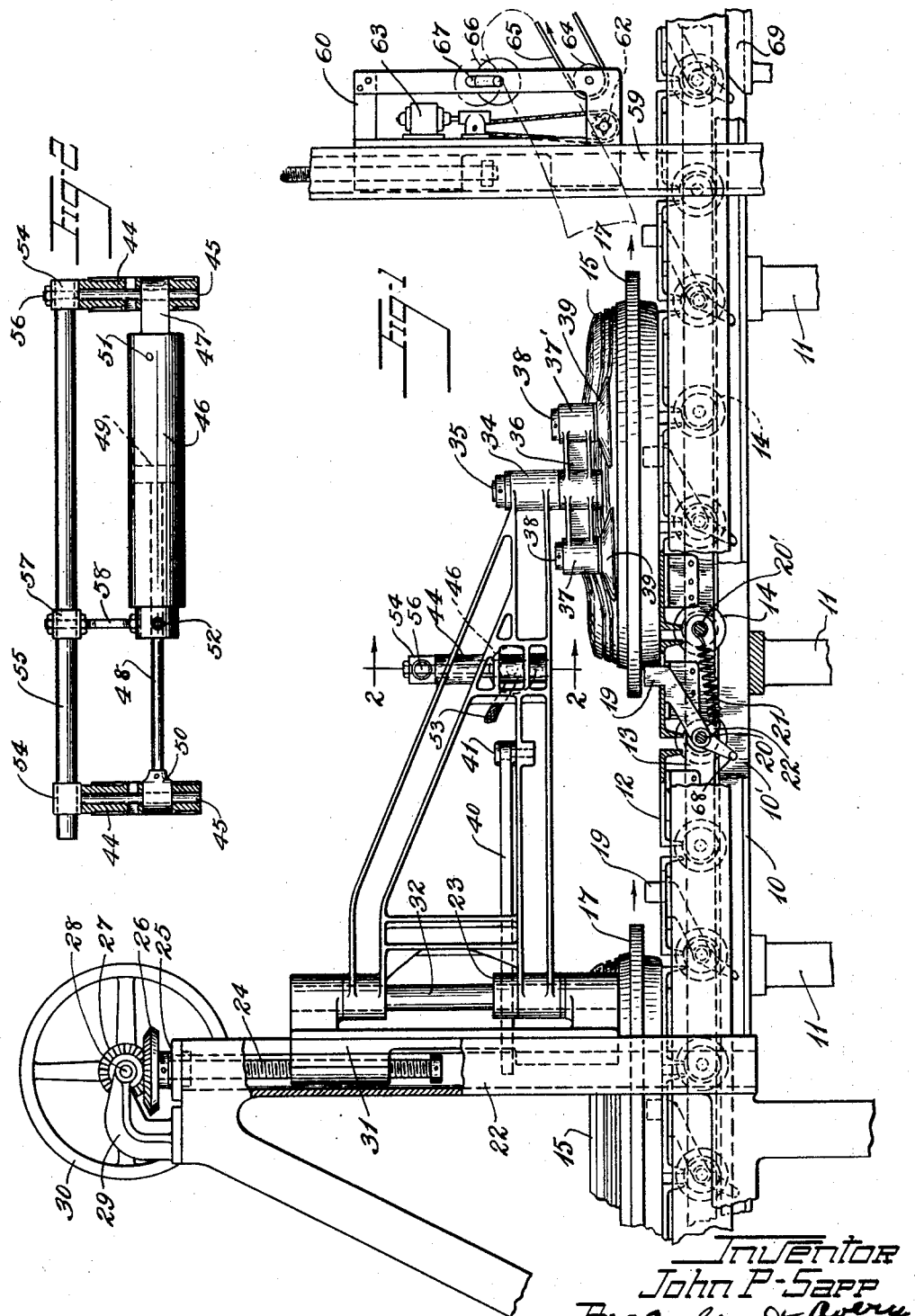
Inventor
John P. Sapp
By Eakin & Avery
Attys.

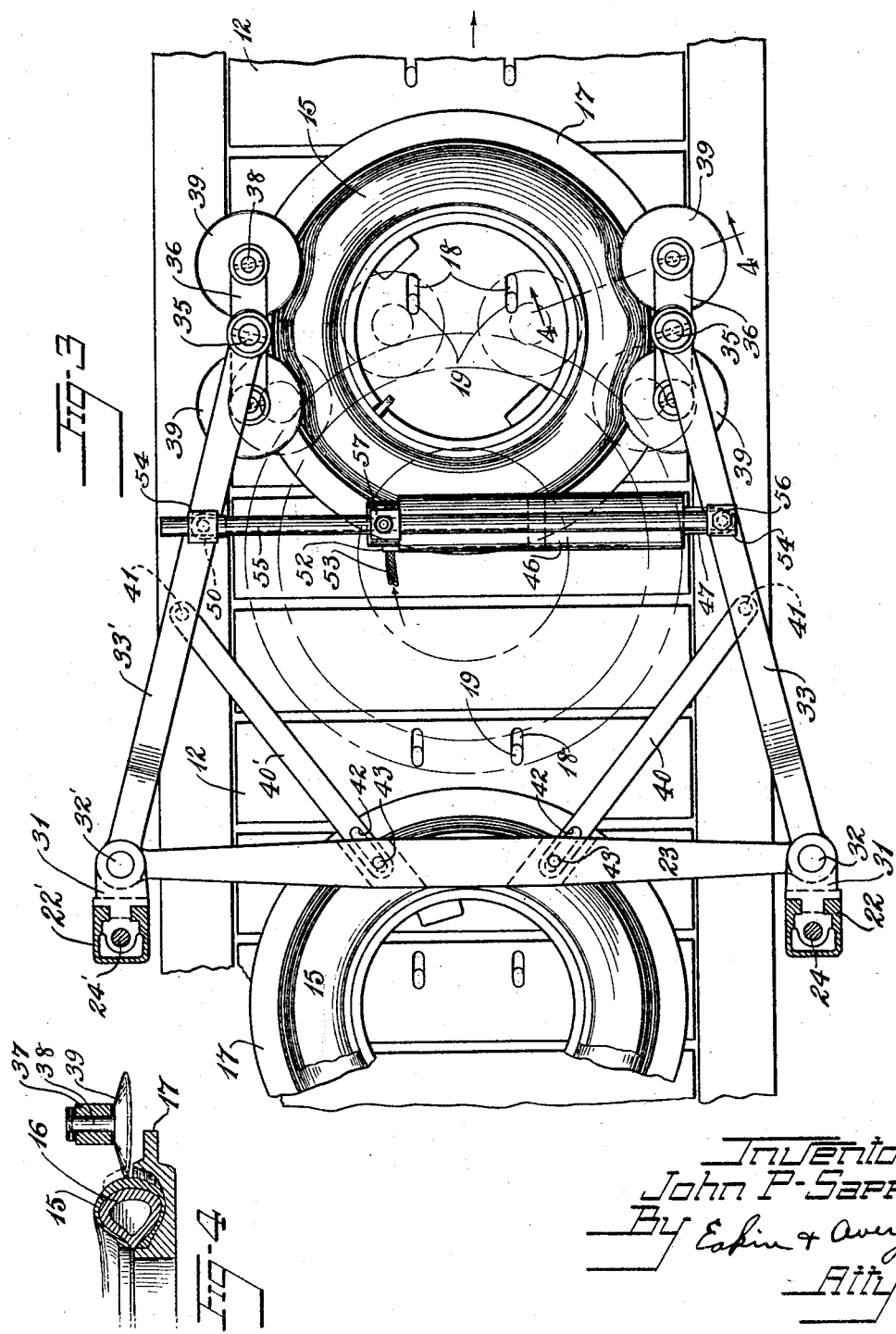

Patented Jan. 31, 1933

1,895,943

UNITED STATES PATENT OFFICE

JOHN P. SAPP, OF KENT, OHIO, ASSIGNOR TO THE B. F. GOODRICH COMPANY, OF NEW YORK, N. Y., A CORPORATION OF NEW YORK

METHOD OF AND APPARATUS FOR REMOVING TIRES FROM MOLDS

Application filed March 25, 1932. Serial No. 601,112.

This invention relates to a method of and apparatus for removing tires or other flexible molded articles from molds.

The principal objects of the invention are to effectually loosen the article from adhesive contact with the mold without injury to the tire, to provide for positive automatic operation and to reduce cost of manufacture and increase production.

Other objects will be apparent from the following description and the accompanying drawings.

In the drawings:

Fig. 1 is a side elevation of a portion of a mold conveyor provided with tire loosening and removing devices and showing one tire in a mold half before the loosening operation has been performed, one tire in a mold half being operated upon by the loosening mechanism, and, in dot and dash lines, the position assumed by the tire upon leaving the mold, parts being broken away.

Fig. 2 is a detail view partly in section on line 2—2 of Fig. 1.

Fig. 3 is a plan view, partly in section, of the tire loosening mechanism and a portion of the conveyor, parts being broken away.

Fig. 4 is a detail view in section on line 4—4 of Fig. 3 showing the manner in which the tire is deflected from normal shape during the loosening thereof from the mold.

Referring to the drawings, the numerals 10, 10' designate the stationary rails, supported by frames 11, on which a travelling platform conveyor comprising supporting slats 12, side chains 13, and anti-friction rollers 14, is guided. The conveyor may be of any length and usually travels past a series of vulcanizers from which the vulcanized tires or other articles contained in molds may be withdrawn and placed on the conveyor. By means of mechanism not shown, and forming no part of this invention, the upper halves of the two part molds are removed, leaving each tire 15 and its enclosed pressure bag 16 in the lower mold half 17 to which the tire is held by adhesion, atmospheric pressure, and the reentrant portions of the mold which form the tread of the tire. In this condition the tires are conveyed in the direction indicated by the arrows in Fig. 1.

In order to positively advance the lower mold half 17 and the tires therein contained, some of the slats 12 are formed with openings 18 through which driving dogs 19 pivoted on cross rods 20 of the conveyor project. Each dog 19 is held in projecting relation by a spring 21, one end of which is attached to an adjacent cross rod 20' of the conveyor and the other end of which engages an arm 22 integral with dog 19. A second integral arm 68 on the dog 19 is adapted to engage a stationary cam 69 by which the dog may be retracted where not required for mold driving purposes.

Located along the path of the conveyor at the sides thereof and straddling the rails 10, 10' are a pair of frames 22, 22', having vertical guide-ways machined therein to slidably engage a cross-head 23. Screws 24, 24' extend vertically of the frames 22, 22' and are journaled in bearings 25. Each screw carries rigidly mounted thereon a bevel gear 26 adapted to mesh with a bevel pinion 27 rigidly mounted on a cross shaft 28 journaled in bearing brackets 29 mounted on frames 22, 22'. Cross-shaft 28 is provided with a hand wheel 30, the arrangement being such that screws 24, 24' may be rotated in unison by handwheel 30.

Cross-head 23 is provided with integral threaded lugs 31 which are engaged by the screws 24, 24' whereby the cross-head 23 may be raised or lowered as desired by rotation of the hand-wheel 30.

Cross-head 23 is provided with lugs for rigidly supporting in vertical position and spaced relation a pair of shafts 32, 32'. A pair of swing-frames 33, 33' are each journaled on one of said shafts for horizontal swinging movement. Each of the swing-frames is provided at its free extremity with a substantially vertical bearing 34 in which a shaft 35 is free to rotate.

A yoke 36 is mounted on each shaft 35 and is formed to provide a plurality of journals 37, 37' in which the shanks 38 of tire-loosening discs 39 are journaled parallel to shaft 35.

The axes of journals 34 are preferably inclined at a slight angle to the vertical so that the angles which they make with the plane of the conveyor are least in the direction of mold approach for a purpose to be hereinafter described.

Swinging movement of the frames 33, 33' is limited by a pair of links 40, 40', each of which is pivoted to one frame at a point intermediate of its length as at 41. Each link is slotted as at 42 and a pin 43 on cross-head 23 passing through said slot permits limited swinging motion of the swing-frame.

Swing frames 33, 33' are each provided with bearings 44, intermediate their extent in which are journaled vertical rods 45. An air cylinder 46 is provided with a lug 47 which is pivoted on one of the rods and a piston rod 48, having a piston 49 which fits the cylinder, is provided with a knuckle 50 which is pivoted on the other rod. Cylinder 46 is closed at both ends except for a vent 51 near its pivoted end and a port 52 at its opposite end which is connected by a flexible hose 53 to a source of pressure such as a compressed air line (not shown). The arrangement is such that when air is admitted to cylinder 46, swing frames 33, 33' are urged toward each other.

Rods 45 have enlarged heads 54 which are cross-bored to engage a guide rod 55 which is fastened to one of the rods 45 by a bolt 56. A bushing 57 on guide rod 55 supports the rod-end of cylinder 46 through a hanger 58 and prevents excessive wear on the piston rod 48 and its stuffing box.

Located along the conveyor beyond the tire loosening mechanism just described is a pair of frames 59, similar to frames 33, 33' on which is adjustably and slidably mounted for vertical movement a carriage 60 which carriage has suitable horizontal bearings for a fluted rotatable shaft 62 adapted to be rotated in a clockwise direction (see Fig. 1) by a motor 63 through suitable gearing. A horizontally mounted roller 64 also mounted in the frame is embraced by a conveyor belt 65 which extends to any convenient point of delivery and is driven in the direction indicated by the arrow. A weighted pressure roller 66 carried in slotted bearings 67 in frame 60 is adapted to assist the conveyor in pulling the tires from the mold.

The operation of the device is as follows: The cross head 23 is adjusted to such an elevation that the loosening discs 39 just clear the top of the mold-half 17. The frame 60 is also adjusted to such an elevation that the fluted bar 62 just clears the mold half 17. Air under pressure is admitted to cylinder 46 which causes swing frames 33, 33' to approach each other. As the driving dogs 19 advance the mold member 17 to the position shown in dot and dash lines in Fig. 3, the discs 39 contact with the tread portion of the tire in the position shown in dot and dash lines. During further movement of the mold the leading portion of the tire is deflected away from the mold surface and thereafter the swing-frames 33, 33' are forced apart by the tire, the discs 39 changing their position progressively and progressively loosening the tire by deflection of its walls as seen in Fig. 3 until the tire passes from contact therewith, thereupon the leading portion of the tire which is still in the mold contacts with the rotating fluted bar 62 and is lifted thereby from the mold onto the conveyor 65, the weighted roller 66 assisting by increasing the pull of the conveyor belt.

Where the axis of the shaft 35 is slightly inclined as heretofore described the inclination of the discs 39 to the plane of the tire causes a lifting action of the discs due to the resistance of their contact with the tread of the tire and their tendency to rotate without slippage at an angle to the plane of the tire. This results in a lifting component of the rotative forces which lifts the tire progressively from the mold while the tire is being loosened therefrom. The inclination of the axis of the yoke also causes the respective discs on one side of the conveyor to contact with the tire at slightly different elevations, thereby distributing the distortion of the tire over a wider zone of the tread surface.

I claim:

1. Apparatus for loosening a molded tire from a mold member, said apparatus comprising a conveyor for advancing the mold member edgewise, and a rotatable disc adapted peripherally to engage the exposed marginal surface of the tire in circumferentially progressive rolling engagement, said disc having its axis inclined to the plane of travel of said mold.

2. Apparatus for loosening a molded tire from a mold member, said apparatus comprising a conveyor for advancing the mold member edgewise, and a plurality of rotatable discs adapted to simultaneously engage and progressively contact with the exposed marginal surface of the tire by rolling engagement circumferentially of its tread, said discs being adapted to rotate at an angle to the plane of the tire.

3. Apparatus for loosening a molded article from a mold member, said apparatus comprising a conveyor for advancing the mold member, a rotatable disc supporting yoke, means for supporting said yoke with its axis angularly disposed to the plane of travel of said mold, a plurality of articles deflecting discs rotatably mounted on said yoke, and yieldable pressure means for maintaining said discs in the path of the article in said mold.

4. The method of loosening a flexible tire from a mold member which comprises advancing the mold member edgewise along a determinate path, and progressively deflecting circumferentially successive portions of the tread of the tire radially from contact with the mold as the mold is so advanced.

5. The method of loosening a flexible tire from a mold member, which comprises advancing the mold member edgewise along a determinate path, and progressively deflecting circumferentially successive portions of the tread of the tire radially from contact with the mold by rolling contact therewith as the mold is so advanced.

6. The method of loosening a flexible tire from a mold member, which comprises advancing the mold member edgewise along a determinate path, progressively deflecting circumferentially successive portions of the tread of the tire radially from contact with the mold as the mold is so advanced, and simultaneously effecting a lifting movement of the tire away from the mold.

7. The method of loosening a flexible tire from a mold member, which comprises advancing the mold member edgewise along a determinate path, radially deflecting a leading portion of the article from mold contacting relation, and progressively effecting local deflection of the tread of the tire by rolling contact of the deflecting means circumferentially along its tread.

8. The method of loosening a flexible tire from a mold member, which comprises advancing the mold member edgewise along a determinate path, radially deflecting a leading portion of the article from mold contacting relation, and progressively effecting separation of the remainder of the tire from the mold by rolling pressure radially applied simultaneously progressively around opposite sides of the advancing article.

9. Apparatus for loosening a molded tire from a mold member, said apparatus comprising a conveyor for advancing the mold edgewise, and means for loosening the tire from the mold as it is so advanced, said means comprising a pair of swivel yokes each provided with a pair of tire-engaging discs, and means for applying equalized pressure to said discs transverse of the path of mold travel to cause the discs to roll along substantially the entire periphery of the tire.

In witness whereof I have hereunto set my hand this 16th day of March, 1932.

JOHN P. SAPP.